(12) United States Patent
Yamada et al.

(10) Patent No.: US 11,996,794 B2
(45) Date of Patent: May 28, 2024

(54) MOTOR CONTROL DEVICE

(71) Applicant: DENSO CORPORATION, Kariya (JP)

(72) Inventors: Jun Yamada, Kariya (JP); Seiji Nakayama, Kariya (JP); Kouji Sakaguchi, Kariya (JP); Haruka Miyano, Kariya (JP)

(73) Assignee: DENSO CORPORATION, Kariya (JP)

( * ) Notice: Subject to any disclaimer, the term of this patent is extended or adjusted under 35 U.S.C. 154(b) by 286 days.

(21) Appl. No.: 17/518,880

(22) Filed: Nov. 4, 2021

(65) Prior Publication Data
US 2022/0060138 A1 Feb. 24, 2022

Related U.S. Application Data

(63) Continuation of application No. PCT/JP2020/018550, filed on May 7, 2020.

(30) Foreign Application Priority Data

May 8, 2019 (JP) ................................. 2019-088390

(51) Int. Cl.
*H02P 29/024* (2016.01)
*F16H 61/32* (2006.01)

(52) U.S. Cl.
CPC ............ *H02P 29/027* (2013.01); *F16H 61/32* (2013.01); *F16H 2061/326* (2013.01)

(58) Field of Classification Search
CPC ........ H02P 29/027; H02P 6/085; F16H 61/32; F16H 2061/326; F16H 63/3466; F16H 63/38

USPC ............ 318/434, 599, 560
See application file for complete search history.

(56) References Cited

U.S. PATENT DOCUMENTS

| 6,653,811 | B2* | 11/2003 | Branecky | H02P 1/163 |
| | | | | 318/431 |
| 7,161,314 | B2* | 1/2007 | Nakai | H02P 6/153 |
| | | | | 318/431 |
| 10,243,488 | B2* | 3/2019 | Yabuguchi | H02P 29/027 |
| 2004/0261197 | A1 | 12/2004 | Cho et al. | |
| 2005/0120492 | A1 | 6/2005 | Koo et al. | |
| 2019/0353242 | A1 | 11/2019 | Kamio | |

FOREIGN PATENT DOCUMENTS

| JP | H05-80856 | 4/1993 |
| JP | 2002-325492 | 11/2002 |
| JP | 2005-525202 | 8/2005 |
| JP | 2018-135919 | 8/2018 |

* cited by examiner

*Primary Examiner* — David Luo
(74) *Attorney, Agent, or Firm* — Nixon & Vanderhye P.C.

(57) ABSTRACT

A motor control device controls a drive of a motor having a coil, and includes a drive circuit and a control unit. The drive circuit has a plurality of switching elements, and switches the energization of the coil. The control unit includes an energization control part and a current limit part. The energization control part accelerates and then decelerates the motor, and controls energization of the coil so that a rotation position of the motor stops at a target rotation position. The current limit part limits the current during a deceleration control.

9 Claims, 14 Drawing Sheets

FIG. 8

| ROTATION SPEED [rpm] | 0 | 1000 | 2000 | 3000 | 4000 |
|---|---|---|---|---|---|
| Dlim_l | −60 | −40 | −20 | 0 | 20 |
| Dlim_h | 60 | 80 | 100 | 100 | 100 |

FIG. 9

| BATTERY VOLTAGE VB [V] | 10 | 12 | 14 | 16 |
|---|---|---|---|---|
| CORRECTION COEFFICIENT K1 | 1.2 | 1 | 0.86 | 0.75 |

FIG. 14

| MOTOR ROTATION SPEED [rpm] | 0 | 1000 | 2000 | 3000 |
|---|---|---|---|---|
| COIL CURRENT [A] | 15 | 10 | 5 | 0 | ced
MOTOR CONTROL DEVICE

CROSS REFERENCE TO RELATED APPLICATIONS

This application is a continuation application of International Patent Application No. PCT/JP2020/018550 filed on May 7, 2020, which designated the U.S. and based on and claims the benefits of priority of Japanese Patent Application No. 2019-088390 filed on May 8, 2019. The entire disclosure of all of the above applications is incorporated herein by reference.

TECHNICAL FIELD

The present disclosure relates to a motor control device.

BACKGROUND

Conventionally, in a shift range control device, a drive of a motor is controlled so that the motor stops at a target position.

SUMMARY

A duty when outputting a positive torque is defined as positive, a duty when outputting a negative torque is defined as negative, and a duty at a start of deceleration control is defined as −100 [%]. When controlled in this way, there is a risk of overcurrent due to an induced electromotive force. An object of the present disclosure is to provide a motor control device capable of suppressing the overcurrent.

The motor control device of the present disclosure controls a drive of a motor having a coil, and includes a drive circuit and a control unit. The drive circuit has a plurality of switching elements and switches an energization of the coil. The control unit includes an energization control part and a current limit part.

BRIEF DESCRIPTION OF DRAWINGS

The above and other objects, features and advantages of the present disclosure will become more apparent from the following detailed description made with reference to the accompanying drawings. In the drawings:

FIG. 8 is a map showing a lower duty limit part and an upper duty limit value at a reference voltage according to the first embodiment;

FIG. 9 is a map of correction coefficients according to the first embodiment;

FIG. 14 is a map showing a reference current according to the motor rotation speed according to the third embodiment;

DETAILED DESCRIPTION

In an assumable example, in a shift range control device, a drive of a motor is controlled so that the motor stops at a target position. For example, the drive of the motor is controlled by switching a control including acceleration control, steady control, deceleration control, sudden braking control, and fixed phase energization control.

A duty when outputting a positive torque is defined as positive, a duty when outputting a negative torque is defined as negative, and a duty at a start of deceleration control is defined as −100 [%]. When controlled in this way, there is a risk of overcurrent due to an induced electromotive force. An object of the present disclosure is to provide a motor control device capable of suppressing the overcurrent.

The motor control device of the present disclosure controls a drive of a motor having a coil, and includes a drive circuit and a control unit. The drive circuit has a plurality of switching elements and switches the energization of the coil. The control unit includes an energization control part and a current limit part.

In a first aspect, the energization control part accelerates and then decelerates the motor and controls energization of the coil so that a rotation position of the motor stops at a target rotation position. The current limit part limits the current during deceleration control. In a second aspect, the energization control part accelerates and then decelerates the motor, and energizes the coil by changing a duty ratio so that a rotation position of the motor stops at a target rotation position. The current limit part calculates a duty limit value that limits the duty ratio. The duty limit value is corrected according to the current when energization is performed at a constant duty ratio before a start of deceleration control. As a result, overcurrent can be suppressed.

Hereinafter, a motor control device according to the present disclosure will be described with reference to the drawings. Hereinafter, in a plurality of embodiments, a substantially equivalent configuration will be denoted by an identical reference, and explanation thereof will be omitted.

First Embodiment

Figure 1:
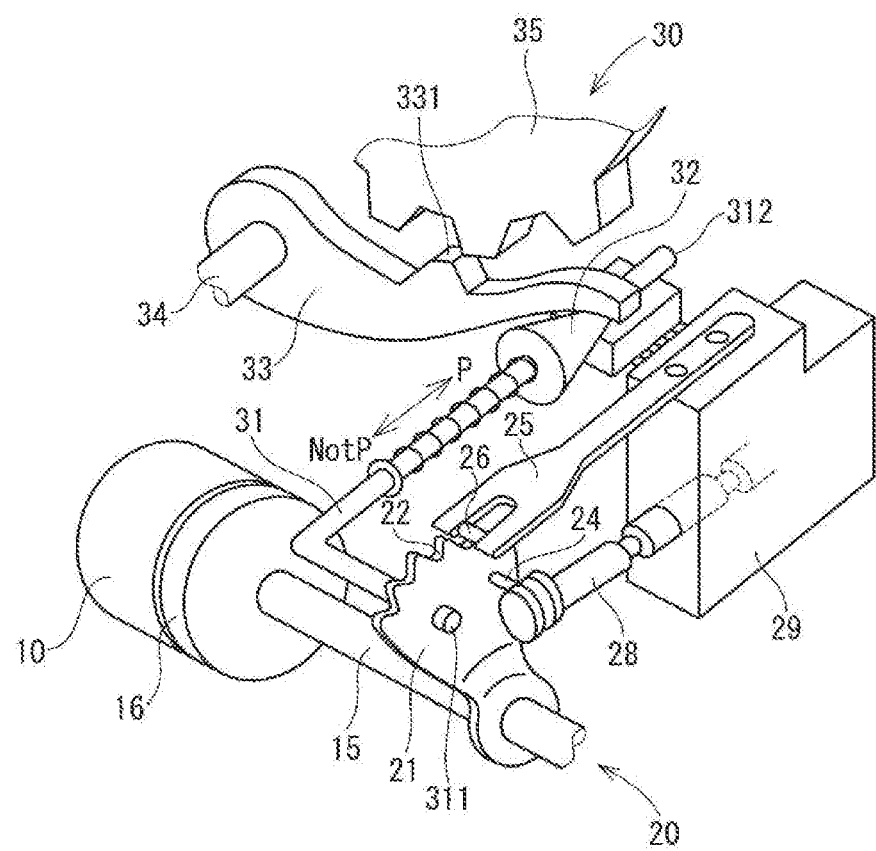
FIG. 1 is a perspective view showing a shift-by-wire system according to a first embodiment.
Figure 2:
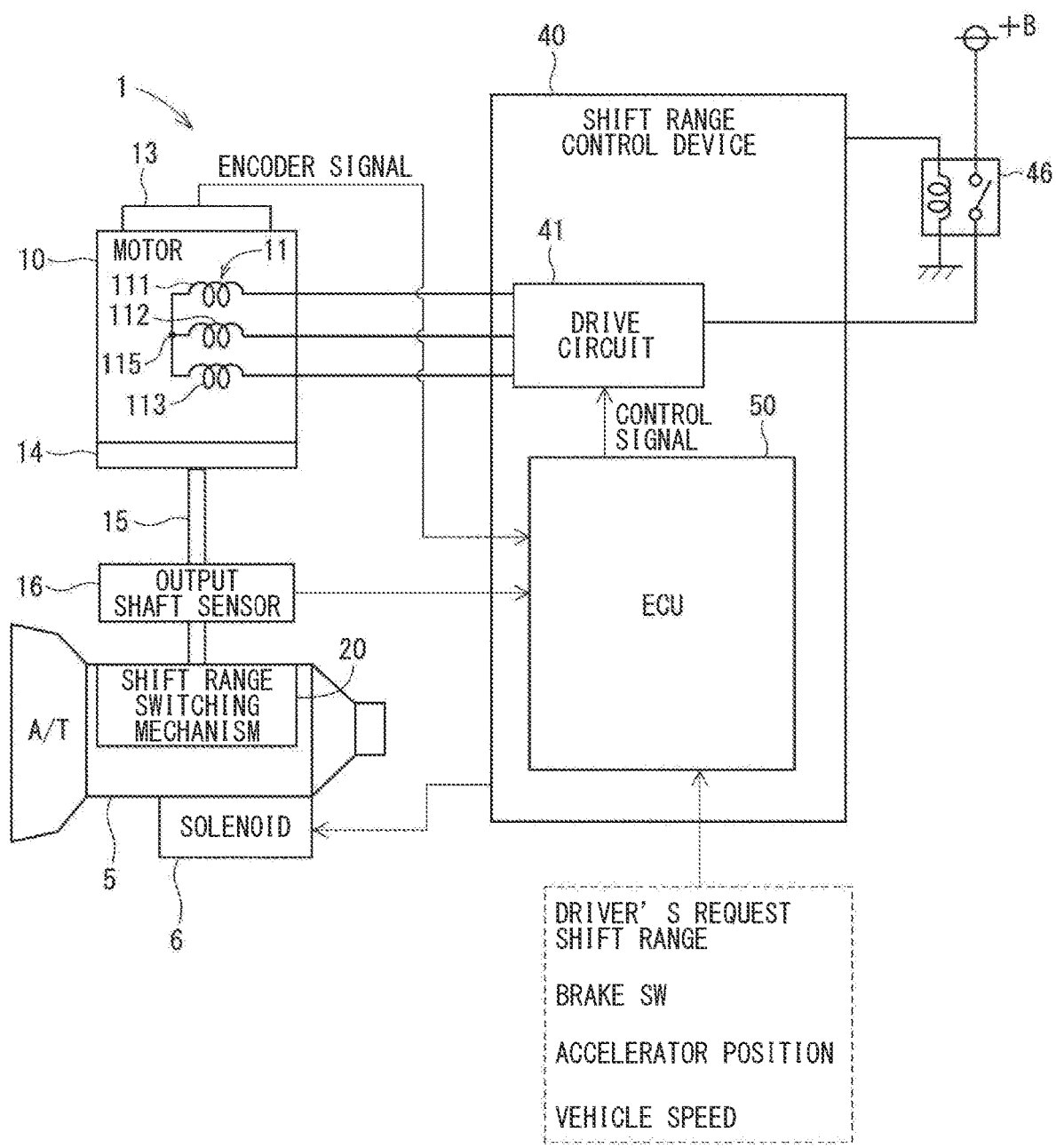
FIG. 2 is a diagram showing a schematic configuration of a shift-by-wire system according to the first embodiment.
Figure 3:
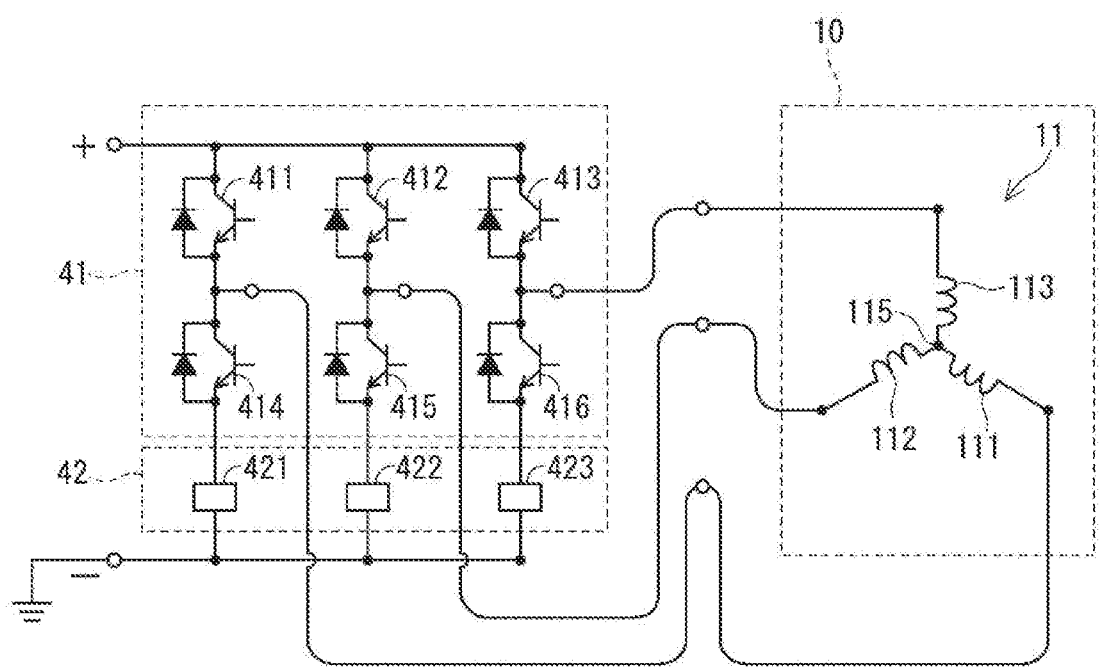
FIG. 3 is a circuit diagram showing a motor and a drive circuit according to the first embodiment.

The first embodiment is shown in FIGS. 1 to 10. As shown in FIGS. 1 and 2, a shift-by-wire system 1 includes, for example, a motor 10, a shift range switching mechanism 20, a parking lock mechanism 30, and a shift range control device 40, and the like. The motor 10 rotates while receiving an electric power from a battery (not shown) mounted on a vehicle (not shown), and functions as a driving source of the shift range switching mechanism 20. The motor 10 of the present embodiment is a permanent magnet type DC brushless motor. As shown in FIG. 3, the motor 10 has a coil 11. The coil 11 is composed of a U-phase coil 111, a V-phase coil 112, and a W-phase coil 113, and is wound around a stator (not shown).

As shown in FIG. 2, an encoder 13 detects a rotary position of a rotor (not shown) of the motor 10. The encoder 13 is, for example, a magnetic rotary encoder and is made up of a magnet that rotates integrally with the rotor, a magnetic detection hall integrated circuit (IC), and the like. The encoder 13 outputs an encoder signal, which is an A phase and B phase pulse signal, at each predetermined angle in synchronization with the rotation of the rotor.

A decelerator 14 is provided between a motor shaft of the motor 10 and an output shaft 15 to decelerate the rotation of the motor 10 and output the decelerated rotation to the output shaft 15. The rotation of the motor 10 is thus transmitted to the shift range switching mechanism 20. An output shaft sensor 16 for detecting an angle of the output shaft 15 is provided on the output shaft 15. The output shaft sensor 16 is, for example, a potentiometer.

As shown in FIG. 1, the shift range switching mechanism 20 includes a detent plate 21, a detent spring 25 and the like. The shift range switching mechanism 20 transmits a rotational drive force output from the decelerator 14 to a manual valve 28 and the parking lock mechanism 30.

The detent plate 21 is fixed to the output shaft 15 and driven by the motor 10, The detent plate 21 has a pin 24 protruding in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into a linear motion and transmits the linear motion to the manual valve 28. The manual valve 28 is provided on a valve body 29, When the manual valve 28 reciprocates in the axial direction, a hydraulic supply path to a hydraulic clutch (not shown) is switched, and an engagement state of the hydraulic clutch is switched. In this way, the shift range is switched.

On a detent spring 25 side of the detent plate 21, four recesses 22 for holding the manual valve 28 at positions corresponding to the respective ranges are provided. The recesses 22 each correspond to each of the shift ranges of (drive), N (neutral), R (reverse), and P (park) ranges from a proximal end of the detent spring 25.

The detent spring 25 is an elastically deformable plate-like member, and is provided with a detent roller 26 at a tip of the detent spring 25. The detent roller 26 fits into one of the recesses 22. The detent spring 25 urges the detent roller 26 toward a rotation center of the detent plate 21. When a rotational force equal to or greater than a predetermined force is applied to the detent plate 21, the detent spring 25 is elastically deformed, and the detent roller 26 moves in the recesses 22. When the detent roller 26 is fitted to any of the recesses 22, swing of the detent plate 21 is regulated. Accordingly, an axial position of the manual valve 28 and a state of the parking lock mechanism 30 are determined to fix a shift range of an automatic transmission 5.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312. When the detent plate 21 rotates in the direction in which the detent roller 26 fits into the recess corresponding to the P range, the conical member 32 moves in the direction of the arrow P.

The parking lock pawl 33 comes into contact with a conical surface of the conical member 32 and is provided so as to be swingable around the shaft part 34. On the parking gear 35 side of the parking lock pawl 33, a protrusion 331 that can mesh with the parking gear 35 is provided. When the conical member 32 moves in the direction of the arrow P due to the rotation of the detent plate 21, the parking lock pawl 33 is pushed up and the protrusion 331 and the parking gear 35 mesh with each other. On the other hand, when the conical member 32 moves in the direction of the arrow NotP, the meshing between the protrusion 331 and the parking gear 35 is released.

The parking gear 35 is provided on an axle (not shown) and is enabled to mesh with the protrusion 331 of the parking lock pawl 33. When the parking gear 35 meshes with the protrusion 331, rotation of the axle is restricted. When the shift range is one of the ranges (Not P range) other than the P range, the parking gear 35 is not locked by the parking lock pawl 33. Therefore, the rotation of the axle 95 is not restricted by the parking lock mechanism 30. When the shift range is the P range, the parking gear 35 is locked by the parking lock pawl 33 and the rotation of the axle is restricted.

As shown in FIGS. 2 and 3, the shift range control device 40 includes a drive circuit 41, an ECU 50, and the like. The drive circuit 41 is a three-phase inverter that switches the energization of the coil 11, and switching elements 411 to 416 are bridge-connected to each other. The switching elements 411 and 414 are paired and belong to U phase. The switching elements 411 and 414 have a connection point therebetween, and the connection point is connected with one end of an U phase coil 111. The switching elements 412 and 415 are paired and belong to V phase. The switching elements 412 and 415 have a connection point therebetween, and the connection point is connected with one end of a V phase coil 112. The switching elements 413 and 416 are paired and belong to W phase. The switching elements 413 and 416 have a connection point therebetween, and the connection point is connected with one end of a W phase coil 113. The other ends of the coils 111 to 113 are connected to each other at a connected portion 115.

A current sensor 42 that detects the current of the coils 111 to 113 is provided between the drive circuit 41 and the ground. The current sensor 42 includes a U-phase current sensor 421 that detects the current of the U-phase coil 111, a V-phase current sensor 422 that detects the current of the V-phase coil 112, and a W-phase current sensor 423 that detects the current of the W-phase coil 113. Hereinafter, each phase current detected by the current sensors 421 to 423 is collectively referred to as a coil current Ic.

ECU 50 is mainly composed of a microcomputer and the like, and internally includes, although not shown in the figure, a CPU, a ROM, a RAM, an I/O, a bus line for connecting these components, and the like. Each process executed by the ECU 50 may be software process or may be hardware process. The software process may be implemented by causing a CPU to execute a program. The program may be stored beforehand in a material memory device such as a ROM, that is, in a readable non-transitory tangible storage medium. The hardware process may be implemented by a special purpose electronic circuit.

As shown in FIG. 2, the ECU 50 controls the switching of the shift range by controlling the drive of the motor 10 based on a driver-requested shift range, a signal from a brake switch, a vehicle speed, and the like. The ECU 50 controls the drive of a shift hydraulic control solenoid 6 based on the vehicle speed, an accelerator opening degree, the driver-requested shift range, and the like. The shift hydraulic control solenoid 6 is controlled to manipulate a shift stage. The number of the shift hydraulic control solenoids 6 is determined according to the shift stage or the like. According to the present embodiment, a singular ECU 50 performs the control to drive the motor 10 and the shift hydraulic control solenoid 6. It is noted that, the ECU may be divided into a motor ECU, which is for motor control to control the motor 10, and an AT-ECU, which is for solenoid control. Hereinafter, a drive control of the motor 10 will be mainly described.

Figure 4:
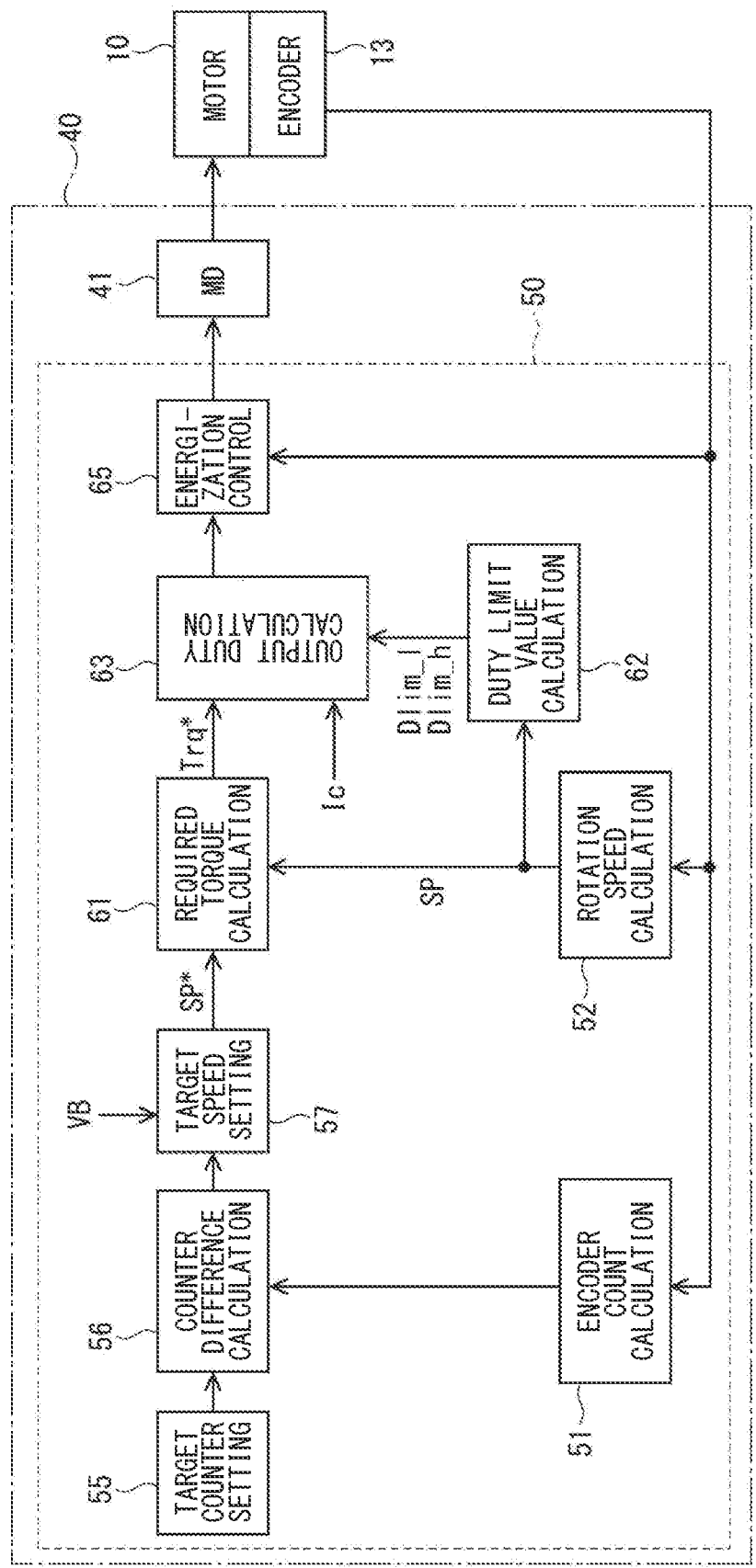
FIG. 4 is a block diagram showing the shift range control device according to the first embodiment.

As shown in FIG. 4, the ECU 50 has an encoder count calculation part 51, a rotation speed calculation part 52, a target counter setting part 55, a counter difference calculation part 56, a target speed setting part 57, and a required torque calculation part 61, a duty limit value calculation part 62, an output duty calculation part 63, and an energization control part 65, and the like, as functional block. The ECU 50 controls the drive of the motor 10 so that an encoder count value Cen stops at a target count value Cen* set according to a required range. Specifically, the ECU 50 controls to accelerate the motor 10, when the required range is switched, performs a steady control to maintain the rotation of the motor 10 at the speed, when the motor rotation speed SP reaches a predetermined speed, and thereafter performs a deceleration control. After that, the motor 10 is stopped so that the encoder count value Cen is within a predetermined control range including the target count value Cen*. In the present embodiment, the drive of the motor 10 is controlled by PWM control. Hereinafter, a duty ratio in PWM control is appropriately simply referred to as "duty".

The encoder count calculation part 51 calculates the encoder count value Can, which is the count value of the encoder 13, based on the A-phase and B-phase pulses output from the encoder 13. The encoder count value C n is a value corresponding to an actual mechanical angle and electric angle of the motor 10. The rotation speed calculation part 52 calculates a motor rotation speed SP, which is the rotation speed of the motor 10, based on the A-phase and B-phase pulses output from the encoder 13. In the present embodiment, the motor rotation speed SP is a so-called rotation speed represented by a unit rpm or the like, but an angular velocity or the like may be used.

The target counter setting part 55 sets the target count value Cen* according to a driver request shift range input by operating a shift lever or the like (not shown). The counter difference calculation part 56 calculates a count deviation ΔCen, which is a difference between the target count value Cen* and the encoder count value Cen. The count deviation ΔCen can be said to be the number of remaining counts up to the target count. The target speed setting unit 57 calculates the target motor rotation speed SP* based on the count deviation ΔCen and the battery voltage VB.

The required torque calculation part 61 calculates a required torque Trq* based on the speed deviation ΔSP, which is the difference between a target motor rotation speed SP* and a motor rotation speed SP. The duty limit value calculation part 62 calculates a lower duty limit value Dlim_l and an upper duty limit value Dlim_h based on the motor rotation speed SP.

The output duty calculation part 63 calculates an output duty D* based on the required torque Trq*, the coil current Ic, and the duty limit values Dlim_l and Dlim_h. The energisation control part 65 performs PWM process based on the output duty D*, and generates a control signal for controlling the on/off operation of the switching elements 411 to 416. The generated control signal is output to the drive circuit 41. In FIG. 4, the drive circuit is described as "MD".

Here, the positive and negative of the coil current Ic and the duty will be described. In the present specification, the coil current Ic and duty when the motor 10 outputs a positive torque are defined as positive values, and the coil current Ic and duty when the motor 10 outputs a negative torque are defined as negative values. Specifically, the coil current Ic and duty when outputting the torque in a direction of rotating the motor 10 in a range switching direction are defined as positive, and the coil current Ic and duty when outputting the torque in a direction of stopping the motor 10 are defined as negative.

Figure 5:
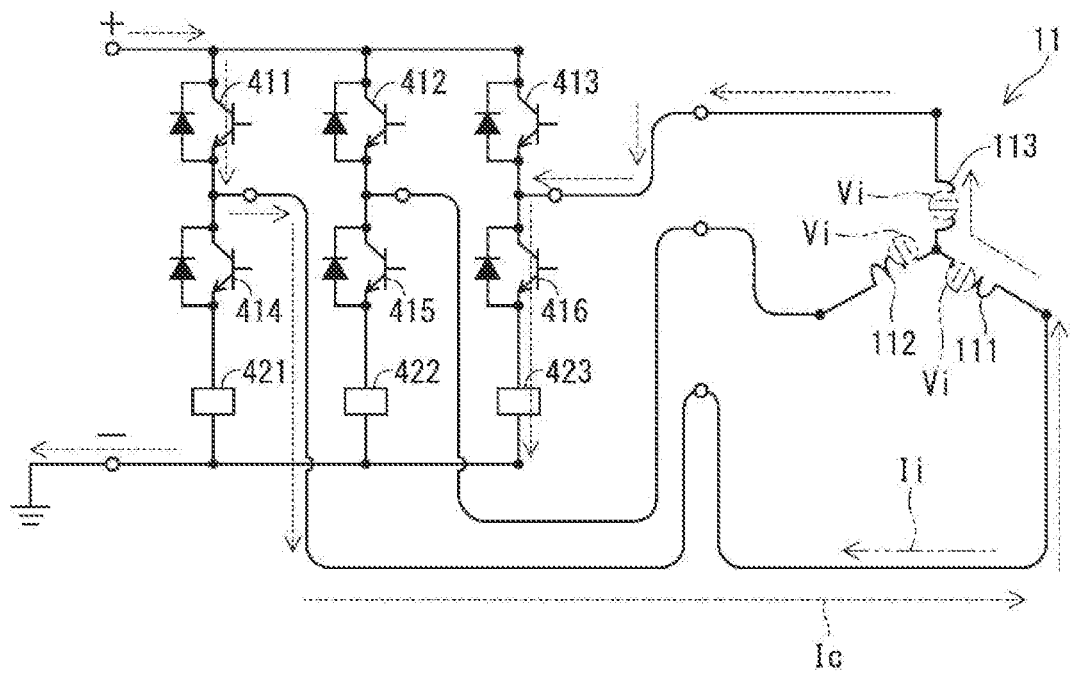
FIG. 5 is an explanatory diagram illustrating an induced electromotive force when the duty is positive according to the first embodiment.
Figure 6:
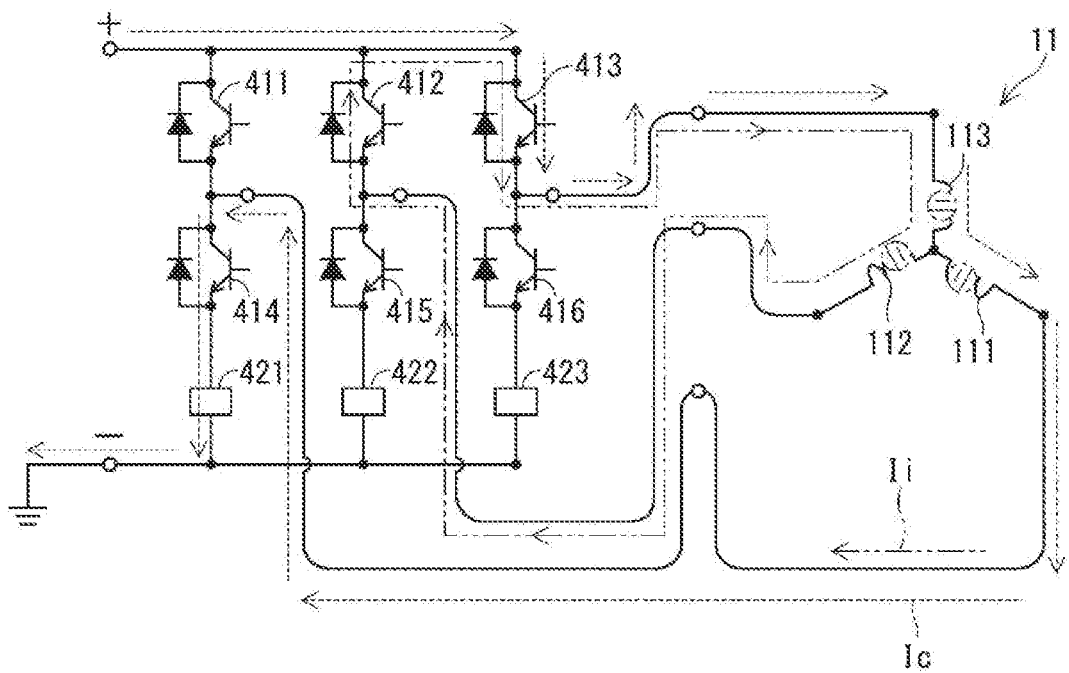
FIG. 6 is an explanatory diagram illustrating an induced electromotive force when the duty is negative according to the first embodiment.

The induced electromotive force in the motor 10 will be described with reference to FIGS. 5 and 6. FIG. 5 shows a case where the coil current Ic and the duty are positive, and FIG. 6 shows a case where the coil current Ic and the duty are negative. In FIGS. 5 and 6, a voltage Vi generated by the induced electromotive force is indicated by a battery symbol circled by a two-dot chain line, an induced current Ii which is the current due to the induced electromotive force is indicated by a two-dot chain line arrow, and the coil current Ic is indicated by a broken line arrow. In addition, some codes are omitted in order to avoid complication.

As shown in FIG. 5, when the coil current Ic and the duty are positive and the acceleration torque is generated, a direction in which the power supply voltage is applied and a direction in which the induced electromotive force is applied are opposite to each other, so that there is no overcurrent due to the induced electromotive force.

Figure 16:
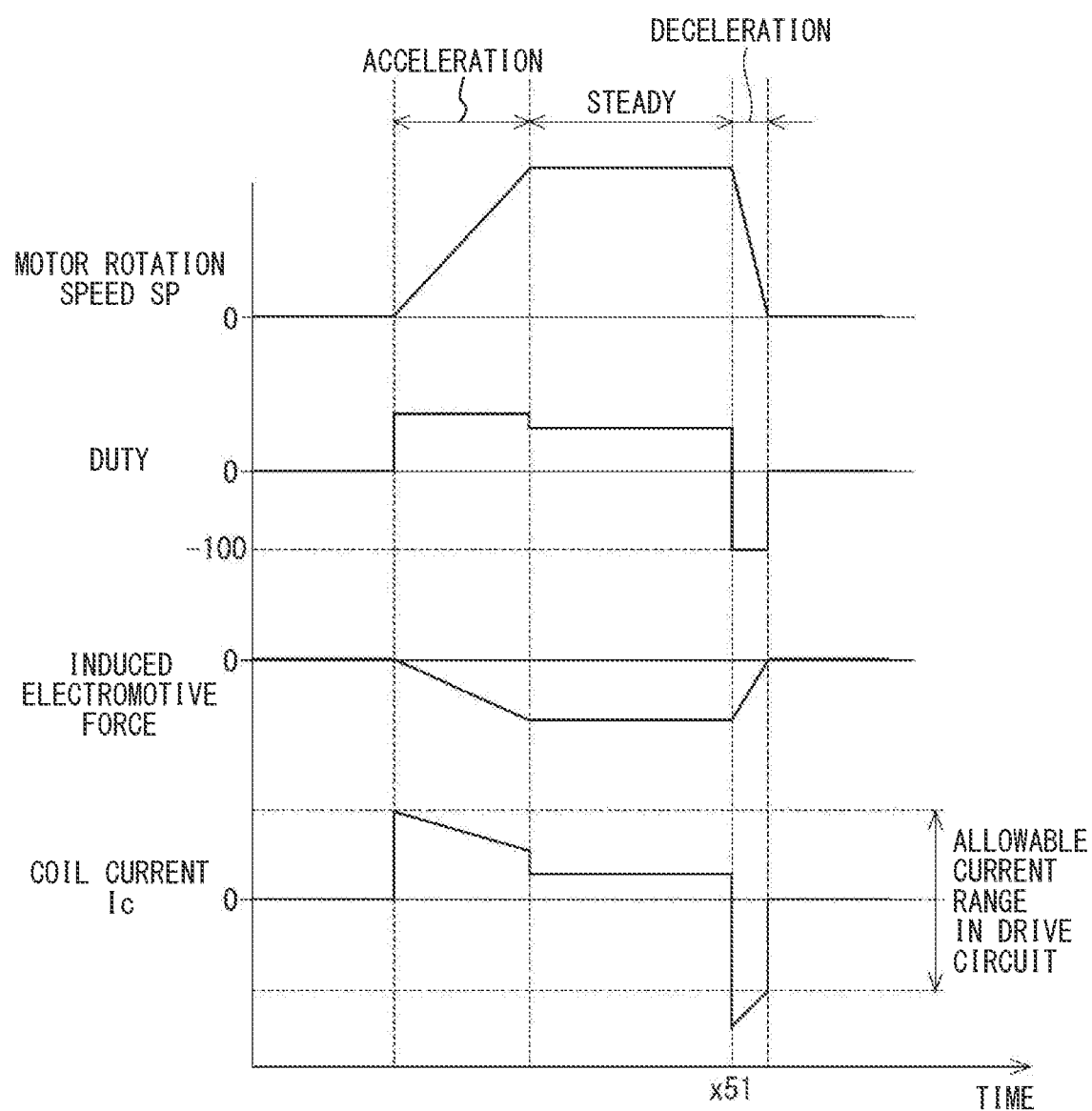
FIG. 16 is a time chart illustrating motor drive control according to a reference example.

On the other hand, as shown in FIG. 6, when the coil current Ic and the duty are negative and the brake torque is generated, the direction in which the power supply voltage is applied and the direction in which the induced electromotive force is applied are in the same direction. Therefore, there is a risk of overcurrent flowing through the switching element that serves as the energization path. In particular, since a reflux current also flows through the switching elements on the high potential side (W-phase switching element 413 in the example of FIG. 6), the overcurrent is particularly likely to occur. Therefore, as in a reference example shown in FIG. 16, if the duty at the start of deceleration control is set to −100 [%] at time x51, an overcurrent exceeding the allowable current range may flow to the drive circuit 41.

Figure 7:
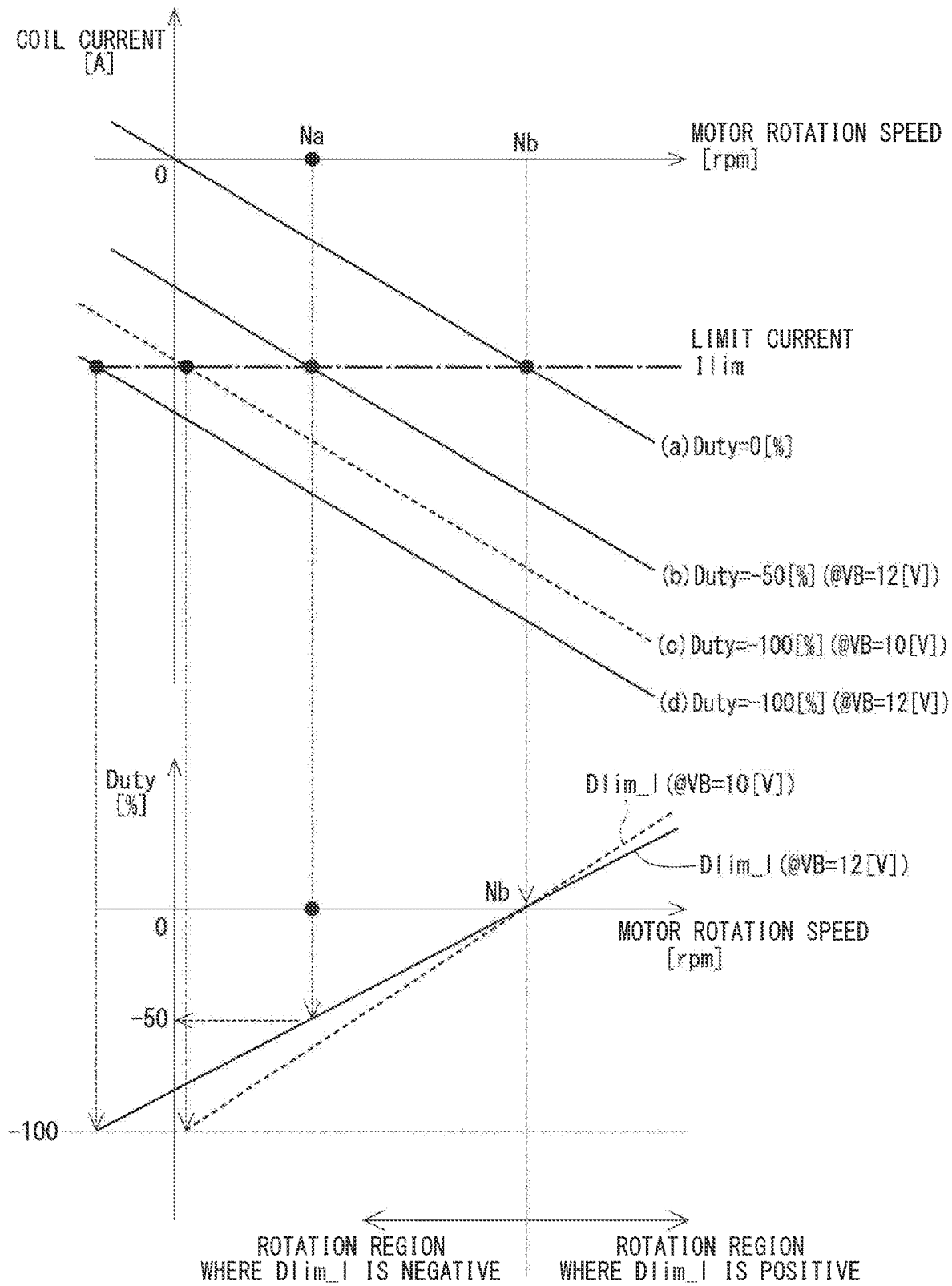
FIG. 7 is an explanatory diagram illustrating a relationship between a motor rotation speed, a coil current, and a duty during deceleration control according to the first embodiment.

FIG. 7 shows the relationship between the motor rotation speed SP, the coil current, and the duty during deceleration control. In FIG. 7, an upper part shows the coil current Ic with respect to the motor rotation speed SP at each duty, and a lower part shows the duty that becomes a limit current Ilim. Further, the limit current Ilim, which is an upper limit of the allowable current of the drive circuit 41, is shown by a long-dotted line.

In the upper part of FIG. 7, a line when the duty is 0 [%] is represented by (a), a line when the duty is −50 [%] and the battery voltage is 12 [V] is represented by (b), a line when the duty is −100 [%] and the battery voltage is 10 [V] is represented by (c), and a line when the duty is −100 [%] and the battery voltage is 12 [V] is represented by (d). As shown in the line (a), when the motor rotation speed SP is 0, no induced electromotive force is generated, so that the coil current Ic flowing through the coil 11 is a current due to the electric power from the battery. If the duty is the same, the coil current Ic is proportional to the battery voltage, and if the battery voltage VB is the same, the coil current Ic is proportional to the duty.

When the motor 10 is rotating (that is, when the motor rotation speed SP<0), if the duty is 0 [%], the current flowing through the coil 11 is the current due to the induced electromotive force because there is no power supply from the battery. At this time, the coil current Ic is proportional to the motor rotation speed SP regardless of the battery voltage, and the larger the motor rotation speed SP, the larger an absolute value on a negative side. When the duty is other than 0 [%] and there is power supply from the battery, the coil current Ic is the sum of the current due to the induced electromotive force and the current due to the battery voltage VB.

A lower duty limit value Dlim_l derived from the relationship between the above lines (a) to (d) and the current limit current Ilim is shown in the lower part. As shown in the above lines (a) to (d), when the motor rotation speed SP increases, the negative current due to the induced electromotive force increases. Therefore, when the negative power supply from the battery increases, the coil current exceeds the allowable current. Therefore, in the present embodiment, in order to prevent overcurrent during the deceleration control, the power supply from the battery is limited by limiting the duty according to the motor rotation speed SP.

For example, when the motor rotation speed SP is a value Na [rpm] and the battery voltage VB is 12 [V], it is necessary to control the duty at −50 [%] or more. In the present embodiment, when the battery voltage VB is 12 [V], the ECU 50 controls the duty so that it is at or above the lower duty limit value Dlim_l shown by the solid line according to the motor rotation speed SR Further, when the battery voltage VB is 10 [V], the ECU 50 controls the duty so that it is at or above the lower duty limit value Dlim_l shown by the broken line according to the motor rotation speed SP. An absolute value of the lower duty limit value Dlim_l is proportional to (1/VB).

Here, the motor rotation speed SP when the coil current Ic becomes the limit current Ilim at duty 0 [%] is defined as a boundary speed Nb. When the motor rotation speed SP is the boundary speed Nb, the coil current Ic reaches the limit current him by the induced electromotive force when the duty is 0 [%], that is, when there is no negative power supply from the battery. Therefore, in a region where the motor rotation speed SP is larger than the boundary speed Nb, the lower duty limit value Dlim_l becomes a positive value. In other words, the duty cannot become negative in the region where the motor rotation speed SP is larger than the boundary speed Nb.

In the present embodiment, during the deceleration control, the lower duty limit value Dlim_l is set to become the positive side as the motor rotation speed SP increases, and is corrected according to the battery voltage VB. Here, "the lower duty limit value is set to become the positive side as the motor rotation speed SP increases" means that the duty is controlled above the lower duty limit value Dlim_l shown in the lower part of FIG. 7. In the region where the motor rotation speed SP is less than the boundary speed Nb, the duty is set to be smaller than the lower duty limit value Dlim_l, and in the region where the motor rotation speed SP is larger than the boundary speed Nb, the duty is set to have an absolute value larger than the lower duty limit value.

FIG. 8 is a base map of the lower duty limit value Dlim_l and the upper duty limit value Dlim_h at the reference voltage VB_r. In this embodiment, the reference voltage VB_r is 12 [V]. In the example of FIG. 8, the boundary speed Nb is 3000 [rpm]. When the motor rotation speed SP is smaller than 3000 [rpm], the reference lower duty limit value Dlim_lr is a negative value, and the absolute value is set to decrease as the motor rotation speed SP increases. When the motor rotation speed SP is larger than 3000 [rpm], the reference lower duty limit value Dlim_lr is a positive value, and the absolute value is set to increase as the motor rotation speed SP increases.

Further, the reference upper duty limit value Dlim_hr is a positive value, and until the motor rotation speed SP is 2000 [rpm], the reference upper duty limit value Dlim_hr increases as the motor rotation speed SP increases. When the motor rotation speed SP is 2000 [rpm] or more, the reference upper duty limit value Dlim_hr is set to 100 [%].

The absolute value of the duty corresponds to a ratio of the on-time, and in the present embodiment, the current due to the induced electromotive force is taken into consideration. Therefore, the upper duty limit value Dlim_h and the lower duty limit value Dlim_l at the same motor rotation speed SP are set to different absolute values. The absolute value of the lower duty limit value Dlim_l is smaller than the absolute value of the upper duty limit value Dlim_h.

FIG. 9 is a correction map related to a correction coefficient K1. The correction coefficient K1 is read according to the battery voltage VB, and the lower duty limit value Dlim_l and the upper duty limit value dlim_h are calculated (See, equations (1) and (2)). In the present embodiment, when the battery voltage VB is relatively high, the correction coefficient K1 is set so that the absolute values of the duty limit values Dlim_l and Dlim_h are smaller than when the battery voltage VB is relatively low. The maps shown in FIGS. 8 and 9 are examples, and the numerical values may be different. Further, an intermediate value is used by interpolating appropriately with a linear shape or the like. The same as above applies to FIG. 14.

$$D\lim\_l = D\lim\_lr \times K1 \quad (1)$$

$$D\lim\_h = D\lim\_hr \times K1 \quad (2)$$

Figure 10:
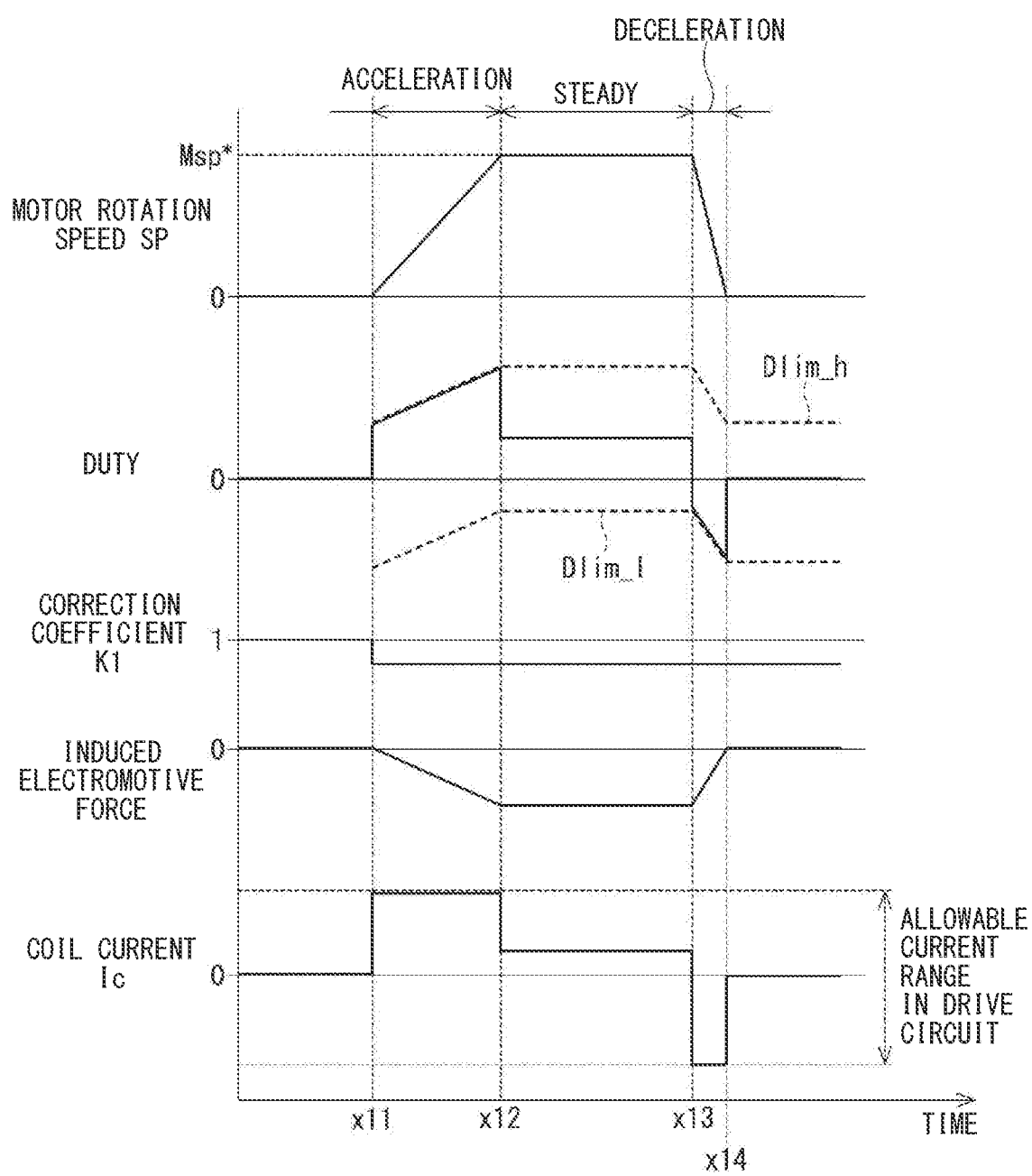
FIG. 10 is a time chart illustrating motor drive control according to the first embodiment.

The motor drive control of the present embodiment will be described with reference to the time chart of FIG. 10. In FIG. 10, a horizontal axis is a common time axis, and the motor rotation speed SP, the duty, the correction coefficient K1, the induced electromotive force, and the coil current Ic are shown from the top. The coil current Ic is substantially equal to the current flowing through the drive circuit 41. The same applies to FIG. 12 and FIG. 14.

When a range switching request is performed at time x11, the lower duty limit value Dlim_l and the upper duty limit value Dlim_h are calculated using the correction coefficient K1 according to the battery voltage VB, and the drive of the motor 10 is controlled so that the duty is between the lower duty limit value Dlim_l and the duty limit value Dlim_h. From time x11 to time x12, the duty is set to the upper duty limit value Dlim_h, and the motor 10 is driven by acceleration control. The upper duty limit value Dlim_h increases as the motor rotation speed SP increases.

When the motor rotation speed SP reaches the target motor rotation speed SP* at time x12, the acceleration control is switched to the steady control. At time x13, when the number of remaining counts up to a target count value Cen* reaches a stop control start count, the steady control is switched to the deceleration control. At time x13, the drive of the motor 10 is controlled by the lower duty limit value Dlim_l set according to the motor rotation speed SP and the correction coefficient K1. In deceleration control, when the motor rotation speed SP decreases, the induced electromotive force decreases and the absolute value of the lower duty limit value Dlim_l can be increased, so the brake torque is increased from the start of deceleration control.

At time x14, when the encoder count value Cen falls within a predetermined range (for example, ±2 counts) including the target count value Cen*, the deceleration control is terminated, and the motor 10 is stopped by, for example, fixed phase energization. In the present embodiment, during acceleration control, the duty is controlled so as not to exceed the upper duty limit value Dlim_h, and during deceleration control, the duty is controlled so as not to fall below the lower duty limit value Dlim_l, so that it can be controlled within an allowable current range of the drive circuit 41 over the range switching period.

As described above, the shift range control device 40 controls the drive of the motor 10 having the coil 11, and includes the drive circuit 41 and the ECU 50. The drive circuit 41 has a plurality of switching elements 411 to 416, and switches the energization of the coil 11. The ECU 50 has the energization control part 65 and the duty limit value calculation part 62. The energization control part 65 accelerates and then decelerates the motor 10 and controls energization of the coil 11 so that the rotation position of the motor stops at the target rotation position. The duty limit value calculation part 62 limits the current during deceleration control. As a result, overcurrent during deceleration control can be suppressed.

In the present embodiment, the current is limited by limiting the duty ratio in the PWM control, and the duty limit value calculation part 62 calculates the duty limit value Dlim_l. The duty ratio is the ratio of the on-time whose absolute value is on time, and the duty ratio when torque is generated in the same direction as before the start of deceleration control is defined as positive, and the duty ratio when torque is generated in the opposite direction is defined as negative. The duty limit value Dlim_l is negative in the low speed rotation range and positive in the high speed rotation range, and is calculated so that the value increases as the rotation speed SP of the motor 10 increases. The duty limit value is corrected by the battery voltage VB, which is an input voltage input to the drive circuit 41. Thereby, the energization can be appropriately controlled so that the coil current Ic is within the allowable range in consideration of the current due to the induced electromotive force.

Second Embodiment

Figure 11:
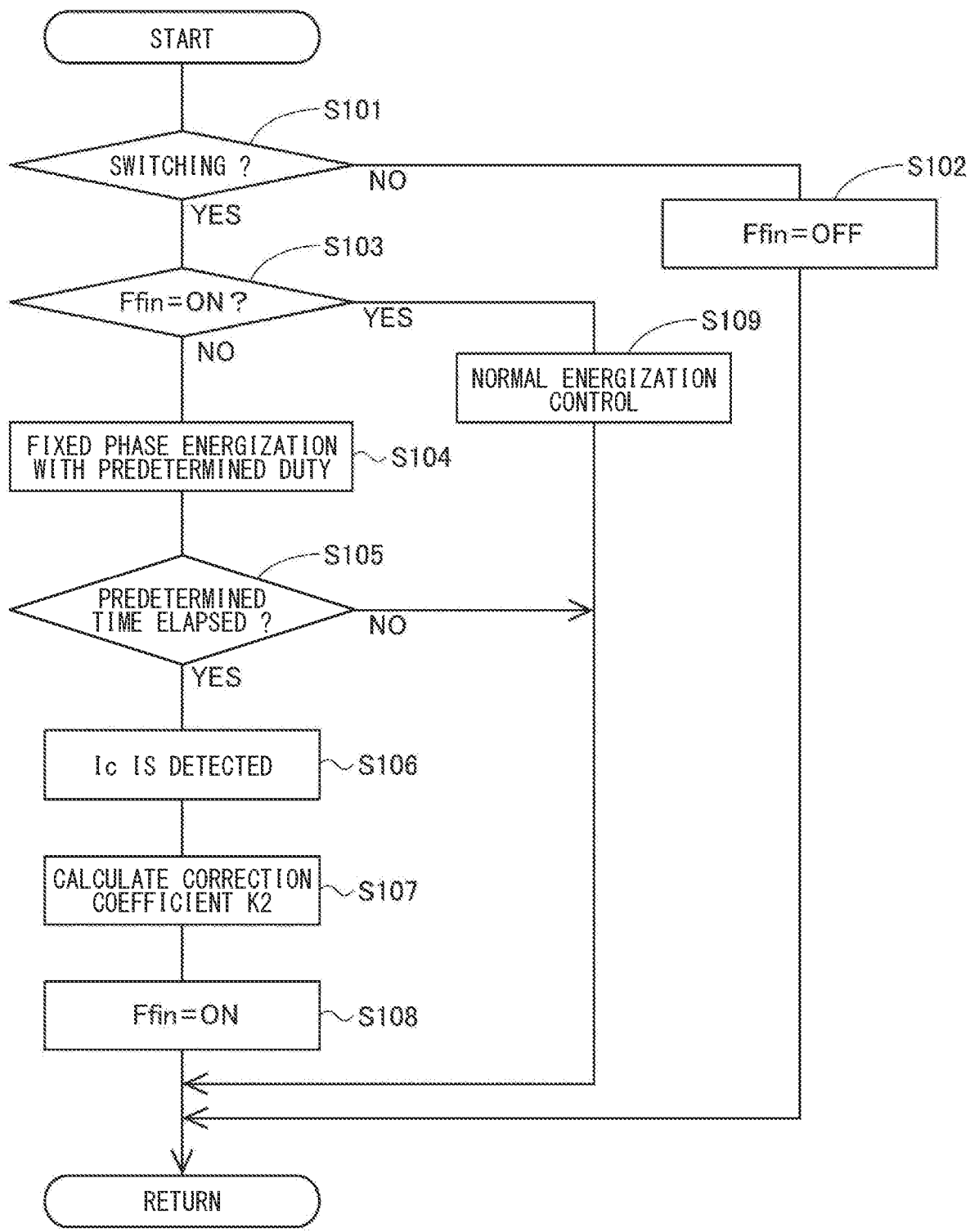
FIG. 11 is a flowchart illustrating a limited duty calculation process according to a second embodiment.
Figure 12:
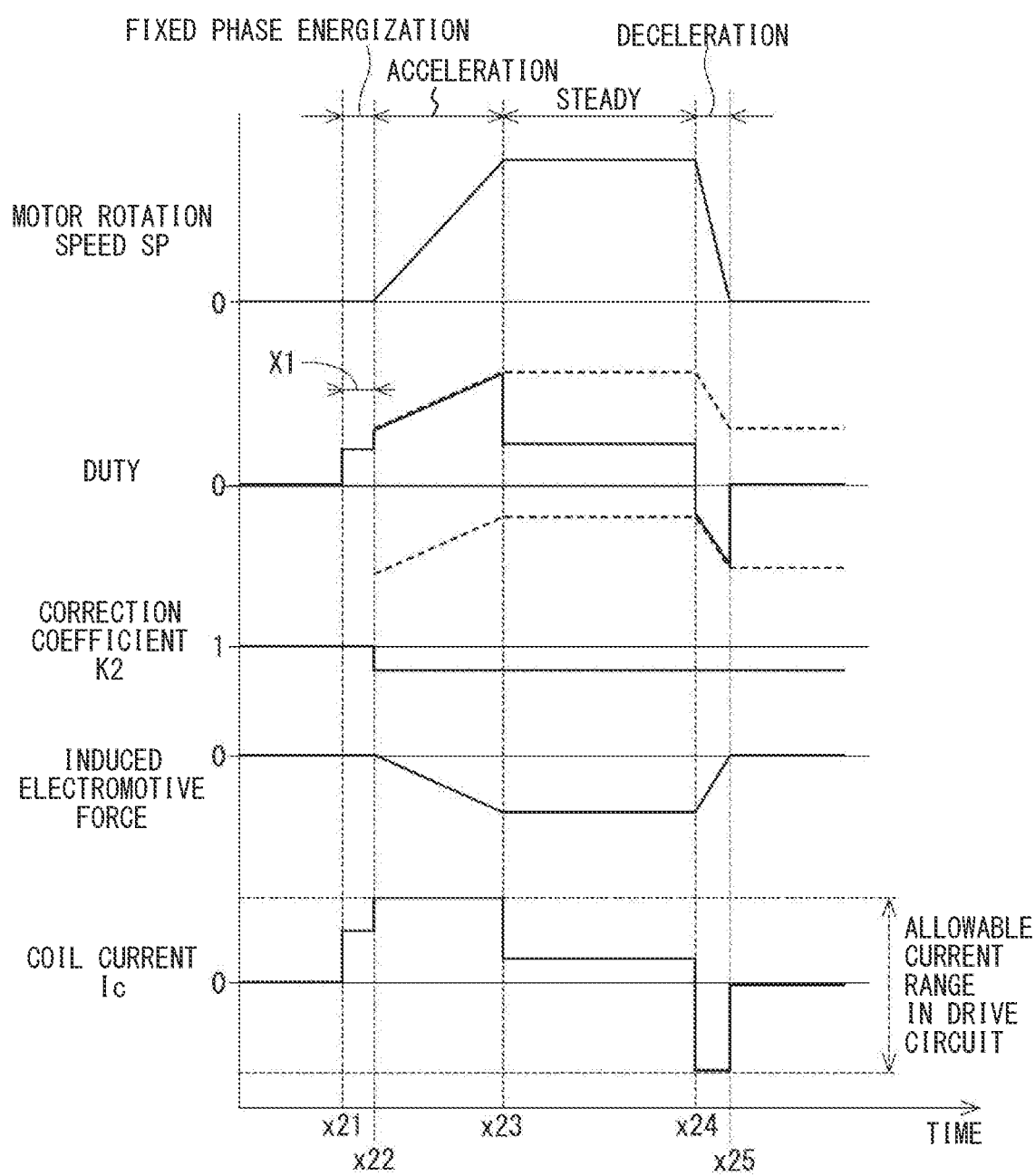
FIG. 12 is a time chart illustrating motor drive control according to the second embodiment.

The second embodiment is shown in FIGS. 11 and 12. In the present embodiment, a correction coefficient K2 used for correcting the duty limit values Dlim_l and Dlim_h is calculated based on the current when the fixed phase energization is performed with a predetermined duty.

The limited duty calculation process of the present embodiment will be described with reference to the flowchart of FIG. 11. This process is executed by the ECU 50 at a predetermined cycle when the start switch such as the ignition switch of the vehicle is turned on. Hereinafter, "step" in step S101 is omitted, and is simply referred to as a symbol "S.". The same applies to the other steps.

In S101, the ECU 50 determines whether or not the shift range is being switched. In the present embodiment, the period from the input of the switching request to the completion of the shift range switching is defined as the shift range switching. If it is determined that the shift range is not being switched (S101: NO), the process proceeds to S102, and a limit correction coefficient calculation completion flag Ffin is turned off. If it is determined that the shift range is being switched (S101: YES), the process proceeds to S103.

In S103, the ECU 50 determines whether or not the limit correction coefficient calculation completion flag Ffin is set. When it is determined that the limit correction coefficient calculation completion flag Ffin is set (S103: YES), the process proceeds to S109. When it is determined that the limit correction coefficient calculation completion flag Ffin is not set (S103: NO), the process proceeds to S104.

In S104, the ECU 50 performs fixed phase energization with a predetermined duty (for example, 40 [%]). For example, in the case of UV phase energization, the switching elements 411 and 415 are turned on and off with a fixed duty.

In S105, the ECU 50 determines whether or not a predetermined time X1 (for example, 20 [ms]) has elapsed since the start of the fixed phase energization. The predetermined time X1 is set according to the time required for the coil current Ic to stabilize. If it is determined that the predetermined time X1 has not elapsed since the start of the stationary phase energization (S105: NO), the process after S106 is not performed. When it is determined that the predetermined time X1 has elapsed since the start of the stationary phase energization (S105: YES), the process proceeds to S106 and the coil current Ic is detected.

In S107, the ECU 50 calculates the correction coefficient K2 based on the coil current Ic detected in S106. The correction coefficient K2 is calculated by an equation (3). Ib in the equation is a reference current when the fixed phase energization is performed at a predetermined duty (for example, 50 [%]) in a reference state. The duty at the time of detecting the reference current and the duty of S104 may be equal or different. Further, if the correction coefficient K1 in the equations (1) and (2) is read as the correction coefficient K2, the duty limit values Dlim_l and Dlim_h can be calculated.

$$K2=Ib/Ic \quad (3)$$

In S108, the ECU 50 sets the limit correction coefficient calculation completion flag Ffin. In S109, the ECU 50 drives the motor 10 under normal energization control so that the encoder count value Cen becomes the target count value Cen*.

The motor drive control process of the present embodiment will be described with reference to the time chart of FIG. 12. When there is a range switching request at time x21, the fixed phase energization is performed with a predetermined duty. At this time, the coil 11 is energized, but the motor 10 does not rotate because the energizing phase is not switched. The correction coefficient K2 is calculated using the coil current Ic at the time x22 when the predetermined time X1 has elapsed from the time x21. The process of time x22 to time x25 is the same as the process of time x11 to x14 in FIG. 10.

In the present embodiment, the fixed phase energization is performed with a predetermined duty before the start of driving the motor 10, and the correction coefficient K2 is calculated based on the coil current Ic at this time. As a result, it is possible to make corrections in consideration of manufacturing variations, temperature characteristics, and the like, so that the duty limit values Dlim_l and Dlim_h can be calculated more appropriately.

In the present embodiment, the duty limit value Dlim_l is corrected according to the current when the fixed phase energization with a constant duty is performed before starting the drive of the motor 10, As a result, the duty limit value Dlim_l can be calculated more appropriately. In addition, the same effects as those of the above embodiment can be obtained.

Third Embodiment

Figure 13:
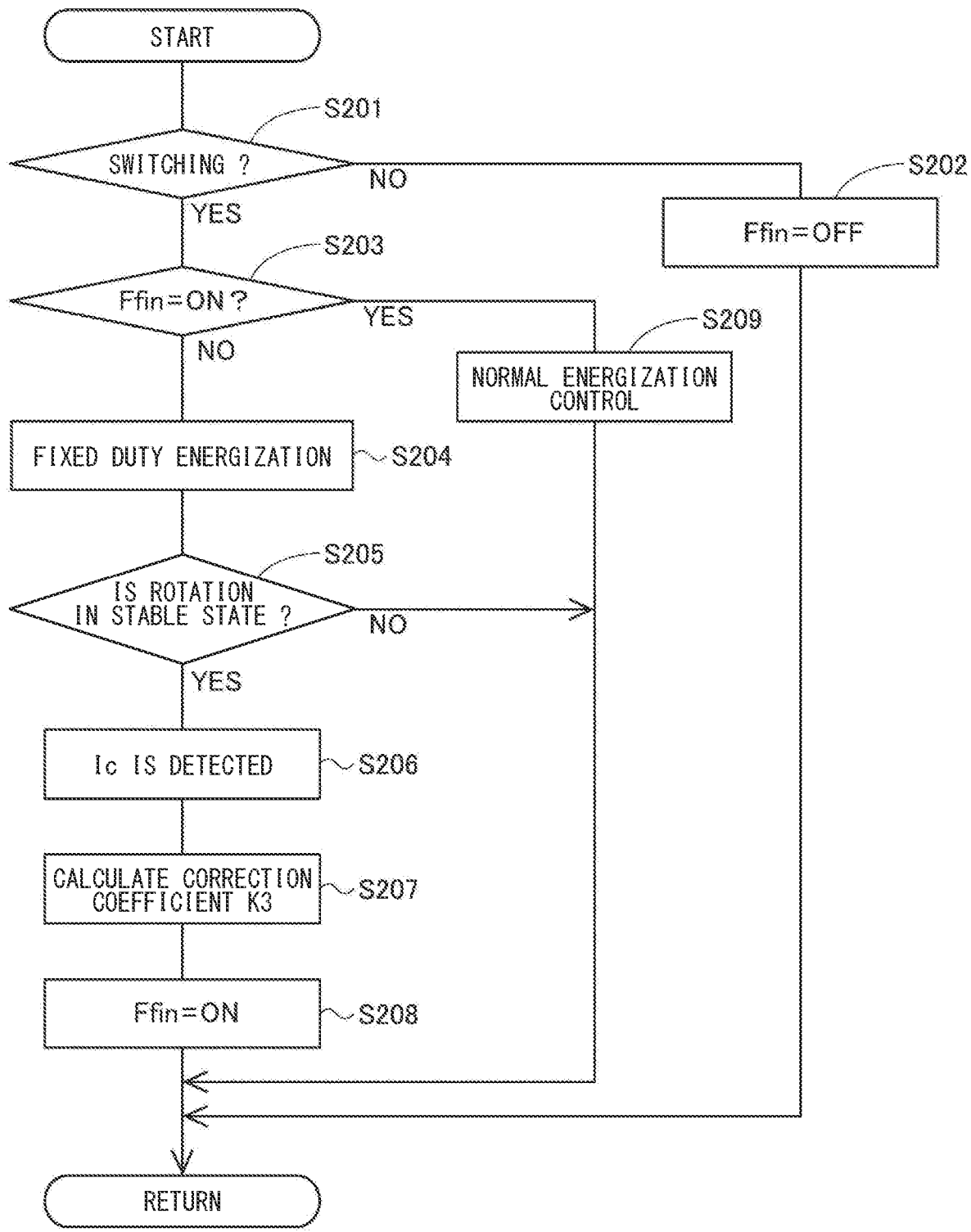
FIG. 13 is a flowchart illustrating a limited duty calculation process according to a third embodiment.
Figure 15:
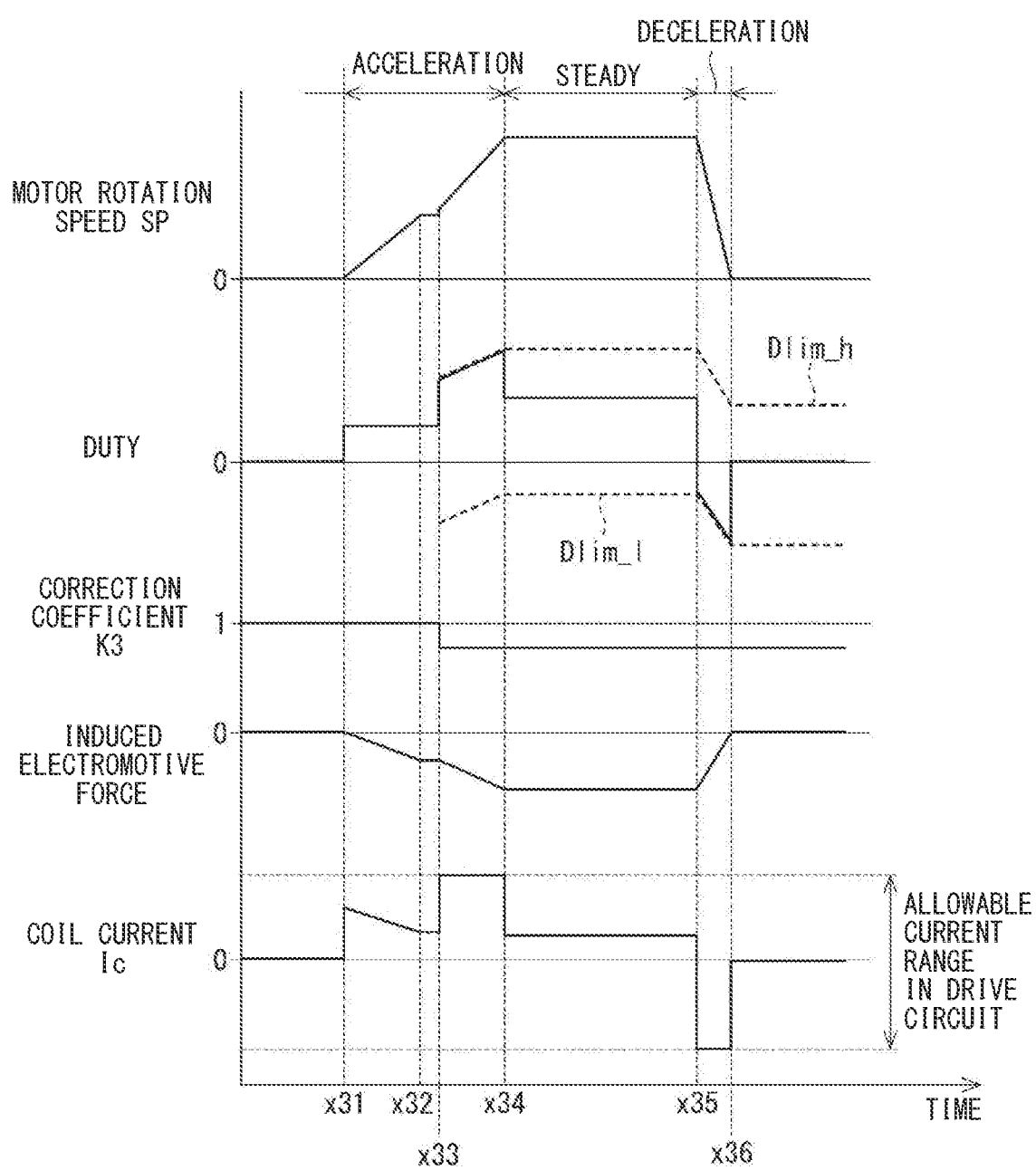
FIG. 15 is a time chart illustrating motor drive control according to the third embodiment.

The third embodiment is shown in FIGS. 13 to 15. In the present embodiment, the correction coefficients K3 used for correcting the duty limit values Dlim_l and Dlim_h are calculated based on the current when the motor 10 is rotated with a predetermined duty.

The limited duty calculation process of the present embodiment will be described with reference to the flowchart of FIG. 13. The processes of S201 to S203 is the same as the processes of S101 to S103 in FIG. 11. In S204, the ECU 50 energizes the coil 11 with a predetermined duty (for example, 40 [%]). Here, since the energizing phase is switched according to the encoder count value Cen, the motor 10 rotates.

In S205, it is determined whether or not the rotation of the motor 10 is in a stable state. For example, when the increase in the motor rotation speed during a stability determination time (for example, 20 [ms]) is equal to or less than a determination threshold value (for example, 5 [rpm]), it is regarded as a rotation stable state. Further, when the fluctuation range of the coil current Ic is within a predetermined range, it may be regarded as a rotation stable state. If it is determined that the rotation of the motor 10 is not in the stable state (S205: NO), the process after S206 is not performed. When it is determined that the rotation of the motor 10 is in the stable state (S205: YES), the process shifts to S206 and the coil current Ic is detected.

In S206, the ECU 50 calculates the correction coefficient K3 based on the coil current is detected in S206. The correction coefficient K3 is calculated by replacing K2 in the equation (3) with K3. A reference current Ib used for the calculation of the correction coefficient K3 is mapped according to the motor rotation speed SP (see FIG. 14), and is set by the map calculation according to the current motor rotation speed SP. The reference current Ib is not limited to the map calculation, and may be calculated by a mathematical formula or the like. Further, if the correction coefficient K1 in the equations (1) and (2) is read as the correction coefficient K3, the duty limit values Dlim_l and Dlim_h can be calculated. The processes of S208 and S209 is the same as the processes of S108 and S109.

The motor drive control process of the present embodiment will be described with reference to the time chart of FIG. 15. When there is a range switching request at time x31, the motor 10 is rotated with a predetermined duty. When it is determined that the motor rotation speed SP is substantially stable at time x32 and the motor rotation speed SP is stable at time x33, the correction coefficient K3 is calculated based on the coil current Ic at this time. Then, when the duty limit values Dlim_l and Dlim_h are set using the correction coefficient K3, the control with the fixed duty is switched to the normal control. The processes of time x34 to time x36 is the same as the processes of time x12 to x14 in FIG. 10.

In the present embodiment, the motor 10 is driven with a predetermined duty at the timing before the deceleration control is started, and the correction coefficient K3 is calculated based on the coil current Ic at the timing when the motor rotation speed SP is stable. As a result, the correction coefficient K3 can be appropriately calculated without delaying the start of driving the motor 10.

In the present embodiment, the duty limit value Dlim_l is corrected according to the current when the motor 10 is being driven and energization is performed with a constant duty before the start of deceleration control. Thereby, the duty limit value Dlim_l can be appropriately calculated while suppressing the decrease in responsiveness.

In the present embodiment, the energization control part 65 accelerates the motor 10 and then decelerates it, and energizes the coil 11 by changing the duty ratio so that the rotation position of the motor 10 stops at the target rotation position. The duty limit values Dlim_l and Dlim_h are corrected according to the current when energization is performed at a constant duty ratio before the start of deceleration control. Here, the energization with the constant duty may be a fixed phase energization in a state where the motor 10 is stopped as in the second embodiment, or as in the present embodiment, the energizing phase may be switched while the motor 10 is being driven, and the control may be performed with a constant duty. In particular, when the current during motor drive is used for correction, the timing of controlling with a constant duty is not limited to the start of driving of the motor 10, and may be any timing before the start of deceleration control. Thereby, the lower duty limit value Dlim_l that limits the duty on the deceleration side and the upper duty limit value Dlim_h that limits the duty on the acceleration side can be appropriately set.

In the above embodiment, the shift range control device 40 corresponds to the "motor control device", the ECU 50 corresponds to the "control unit", and the duty limit value calculation part 62 corresponds to the "current limit part", Further, the encoder count value Cen corresponds to the "motor rotation position", the target count value Cen* corresponds to the "target rotation position", and the battery voltage VB corresponds to the "input voltage". The input voltage is not limited to the battery voltage VB. For example, when a converter or the like is provided between the battery and the drive circuit, the converted voltage is regarded as the input voltage.

Other Embodiments

According to the embodiments described above, the motor is a permanent magnet type three phase brushless motor. In another embodiment, the motor is not limited to the three-phase brushless motor, and an SR motor or the like may be used. In the above embodiment, the coil and the drive circuit are one set. In other embodiments, there may be two or more sets of coils and drive circuits.

In the above embodiment, the motor rotation angle sensor is the encoder. In another embodiment, the motor rotation angle sensor is not limited to the encoder, and for example, a resolver or the like may be used. In the present embodiment, the potentiometer was illustrated as an output shaft sensor. In other embodiments, the output shaft sensor may be something other than a potentiometer, or the output shaft sensor may be omitted.

In the above embodiments, the detent plate is provided with four recesses. In another embodiment, the number of recesses is not limited to four and may be any number. For example, a configuration may be employable where the number of the recesses of the detent plate is two and where the P range and the not P range are switchable therebetween. The shift range switching mechanism and the parking lock mechanism or the like may be different from those in the embodiments described above.

In the above embodiments, the decelerator is placed between the motor shaft and the output shaft. Although the details of the decelerator are not described in the embodiments described above, it may be configured by using, for example, a cycloid gear, a planetary gear, a spur gear that transmits torque from a reduction mechanism substantially coaxial with the motor shaft to a drive shaft, or any combination of these gears. As another embodiment, the decelerator between the motor shaft and the output shaft may be omitted, or a mechanism other than the decelerator reducer may be provided.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. A motor control device for controlling a drive of a motor having a coil, the motor control device comprising:
    a drive circuit configured to have a plurality of switching elements and switch an energization of the coil, and
    a control unit having an energization control part configured to control energization of the coil and a current limit part configured to limit current during a deceleration control, wherein
    the control unit accelerates and then decelerates the motor, and stops a rotation position of the motor at a target rotation position; wherein
    the current limit unit calculates a duty limit value that limits a duty ratio in PWM control,
    in the duty ratio in PWM control, a ratio of an on-time of the switching element is defined as an absolute value, and the duty ratio when torque is generated in a same direction as before a start of deceleration control is defined as positive, and the duty ratio when torque is generated in a direction opposite to that before the start of deceleration control is defined as negative, and
    the duty limit value is negative in a low speed rotation range, and is calculated so that the value increases as a rotation speed of the motor increases.

2. The motor control device according to claim 1, wherein the duty limit value is corrected according to an input voltage input to the drive circuit.

3. The motor control device according to claim 1, wherein the duty limit value is corrected according to a current when a fixed phase energization is performed at a constant duty ratio before starting the drive of the motor.

4. The motor control device according to claim 1, wherein the duty limit value is corrected according to a current when the motor is being driven and energization is performed at a constant duty ratio before the start of deceleration control.

5. A motor control device for controlling a drive of a motor having a coil, the motor control device comprising:
    a drive circuit configured to have a plurality of switching elements and switch an energization of the coil, and
    a control unit having an energization control part configured to control energization of the coil by changing a duty ratio and a current limit part configured to calculate a duty limit value that limits the duty ratio, wherein
    the control unit accelerates and then decelerates the motor, and stops a rotation position of the motor at a target rotation position, and
    the duty limit value is corrected according to current when energization is performed at a constant duty ratio before start of deceleration control.

6. A motor control device for controlling a drive of a motor having a coil, the motor control device comprising:
    a drive circuit configured to have a plurality of switching elements and switch an energization of the coil, and
    a computer including a processor and a memory that stores instructions configured to, when executed by the processor, cause the processor to
    control energization of the coil,
    limit current during a deceleration control,
    accelerate and then decelerate the motor, and
    stop a rotation position of the motor at a target rotation position; wherein
    the computer causes the processor to calculate a duty limit value that limits a duty ratio in PWM control,
    in the duty ratio in PWM control, a ratio of an on-time of the switching element is defined as an absolute value, and the duty ratio when torque is generated in a same direction as before a start of deceleration control is defined as positive, and the duty ratio when torque is generated in a direction opposite to that before the start of deceleration control is defined as negative, and
    the duty limit value is negative in a low speed rotation range, and is calculated so that the value increases as a rotation speed of the motor increases.

7. The motor control device according to claim 6, wherein the duty limit value is corrected according to an input voltage input to the drive circuit.

8. The motor control device according to claim 6, wherein the duty limit value is corrected according to a current when a fixed phase energization is performed at a constant duty ratio before starting the drive of the motor.

9. The motor control device according to claim 6, wherein the duty limit value is corrected according to a current when the motor is being driven and energization is performed at a constant duty ratio before the start of deceleration control.

* * * * *